R. NAGLO.
CAMERA HOLDER.
APPLICATION FILED MAY 20, 1912.
1,103,814.
Patented July 14, 1914.
3 SHEETS—SHEET 3.
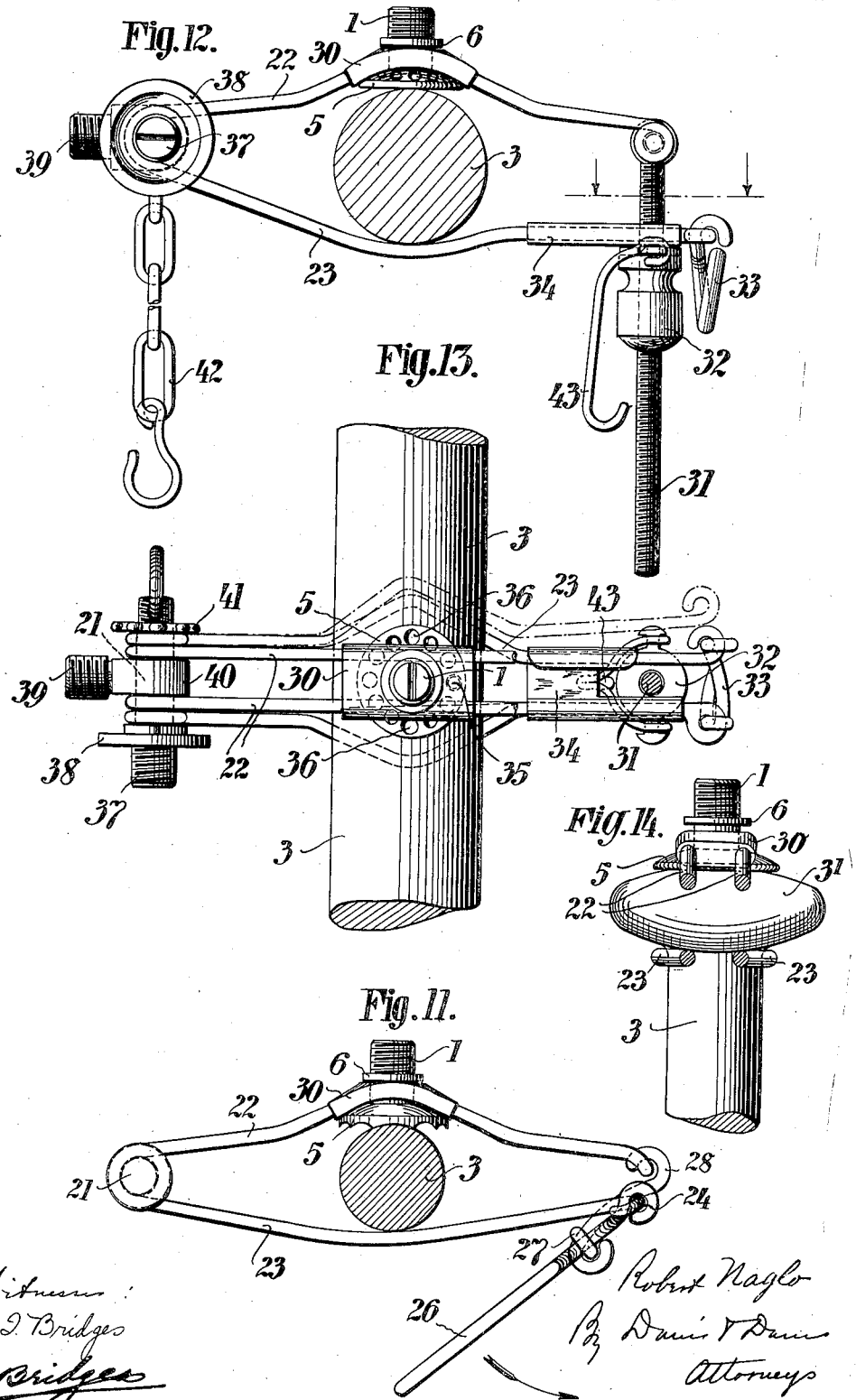

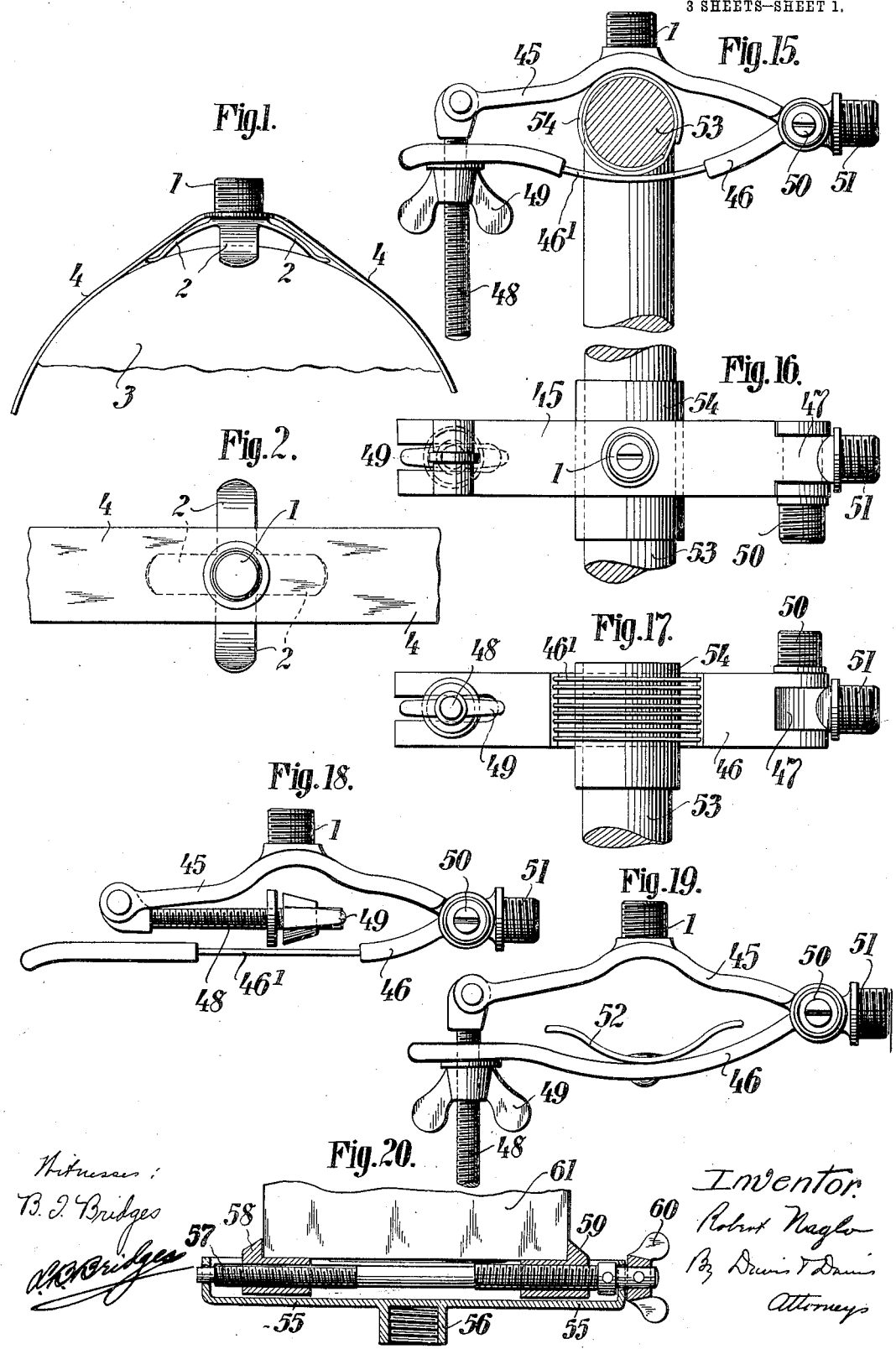

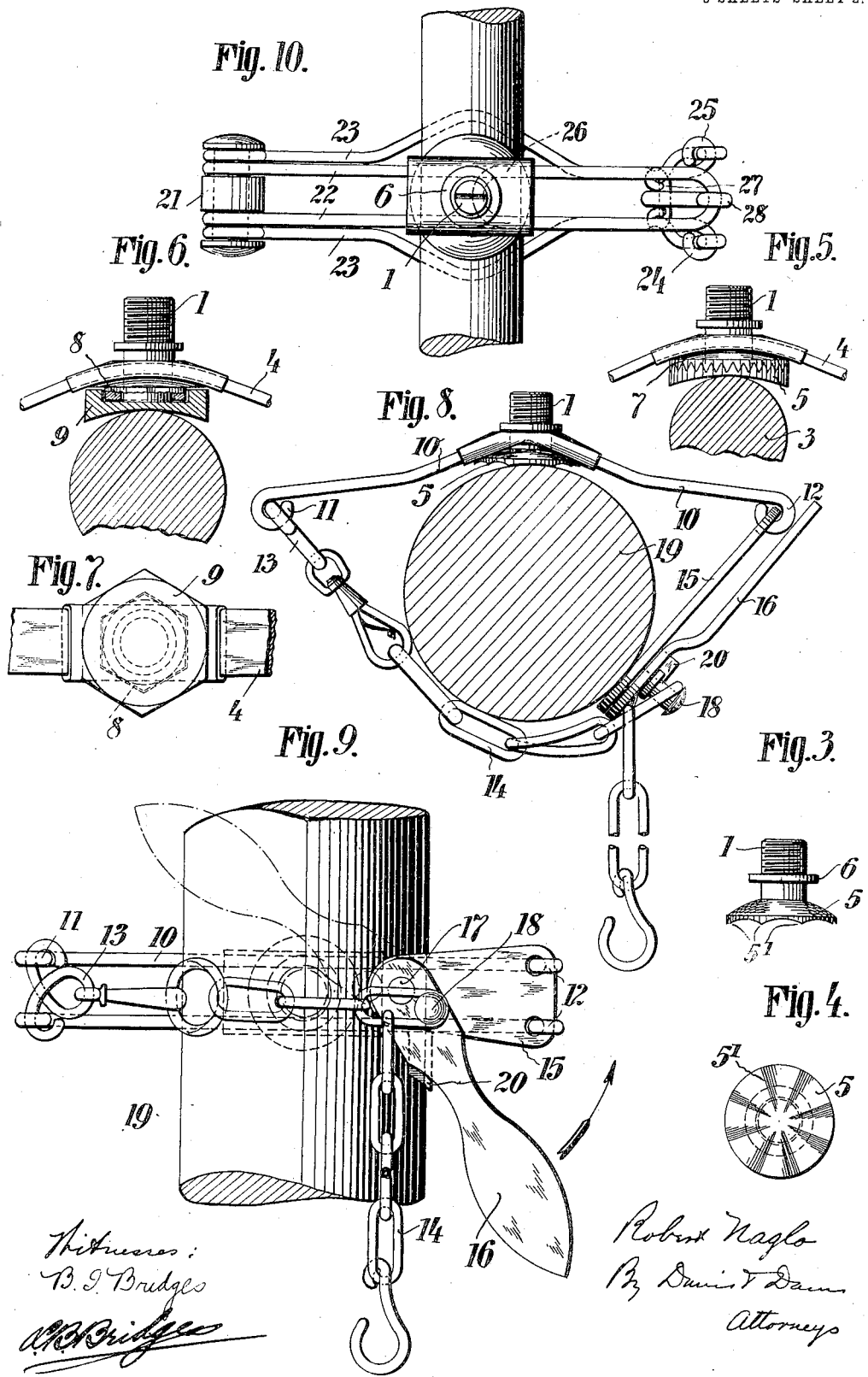

UNITED STATES PATENT OFFICE.

ROBERT NAGLO, OF WIESBADEN, GERMANY.

CAMERA-HOLDER.

1,103,814.

Specification of Letters Patent. Patented July 14, 1914.

Application filed May 20, 1912. Serial No. 698,580.

*To all whom it may concern:*

Be it known that I, ROBERT NAGLO, a citizen of the Empire of Germany, and residing at Wiesbaden, Germany, have invented certain new and useful Improvements in Camera-Holders, of which the following is a specification.

My invention relates to holders for cameras.

As is well-known, amateur photographers frequently find it very troublesome to carry about a stand for the camera, but they can frequently not do without it because the camera must be rigidly held during time exposures. It is true that a number of auxiliary or pocket stands intended to enable the camera to be attached to any stationary object, *e. g.* a walking-stick, umbrella, tree or the like, have been known heretofore, but as a rule they are too expensive and too troublesome in use.

A primary object of my invention is to provide a camera-holder which is not only of very simple construction and very simple in use, but also reliable in action and so small that it can be conveniently carried in the waistcoat pocket.

My improved holder comprises, in its simplest form, a male screw onto which the camera can be screwed, and a support or rest for this screw which, together with the camera, can be prevented from turning or otherwise moving laterally. This support or rest may be a round or angular plate which is rigidly connected with the screw and is preferably provided with projections on its underside in order that it cannot be moved after the holder has been mounted on a stick or the like; instead of the plate, however, rigid or flexible claws and similar means may be employed for this purpose. For mounting the camera-holder on a stick or the like a strap, shackle, clamp or other readily detachable fastener may be used. A plate for clasping the base of the screw may be firmly mounted on this fastener.

Several illustrative embodiments of my invention and modifications thereof are represented by way of example in the accompanying drawings, wherein:—

Figures 1 and 2 are side elevation and plan, respectively, showing a camera-holder comprising a screw having supporting claws or lugs, Figs. 3 and 4 are side elevation and bottom plan view, respectively, showing a modified form comprising a screw having a rigid base-plate, Fig. 5 is a side elevation of a camera-holder comprising a plate for locking the screw, and Figs. 6 and 7 are side elevation, partly in section, and bottom plan view, respectively, also showing a camera-holder comprising a locking plate; Figs. 8 and 9 are side elevation and bottom plan view, respectively, showing a camera-holder whose screw can be fastened by a metal bow or yoke and a chain able to be tightened by means of a lever; Figs. 10 and 11 are top plan view and side elevation showing a clamp carrying the screw and able to be tensioned in the manner of a lever-action bottle-stopper; Figs. 12, 13 and 14 are side elevation, top plan view with part broken away, and end sectional elevation, respectively showing another form of such a clamp; Figs. 15, 16, 17 and 18 are side elevation, top plan view, bottom plan view, side elevation in the folded position, respectively, showing a clamp integral with the screw; Fig. 19 is a side elevation showing a modified form of the latter clamp, and Fig. 20 is a sectional elevation showing a clamp adapted for cameras without a female thread and for connection with my improved camera-holder.

Referring first to Figs. 1 and 2, the male screw 1 to be screwed into the female screw of the camera has preferably flexible claws 2. It is attached to the object 3, *e. g.* a pole, selected as support for the camera, by means of a strap 4 having a hole for the passage of the screw 1. When this camera-holder is to be attached with the photographic camera to a pole, stick, column, or the like it is preferably first screwed tightly to the camera, whereupon the strap 4 is placed about the post 3 and at first pulled only so tight that the holder can still be rotated, so that the camera screwed on the screw 1 can be adjusted. Only when the latter operation is finished is the strap 4 completely tightened and presses the screw so firmly against the post 3 that it can now no longer rotate. The camera is then also firmly mounted on the post.

In the event of a strap or band not being available a cord could be used.

According to the form shown in Figs. 3 and 4 the screw 1 is integral with a plate 5, having radial ribs 5' on its bottom, and with a collar 6 serving as a stop for the screwed-on camera; it can be attached to a suitable support in the same manner as the screw shown in Figs. 1 and 2.

The plate 5 may be provided with holes at its edge, and the attachment means, e. g. a strap, shackle or the like, may be provided with a pin which enters into one of these holes when the screw is mounted on a stick or the like. This form will be explained hereinafter with reference to Figs. 12 and 13.

In the form according to Fig. 5 the base-plate 5, integral with the screw 1, has on its side away from the screw preferably radial teeth, and similar teeth are provided on a plate 7 which is non-revolubly mounted opposite the plate 5 on the means of attachment 4. The screw 1 passes with play through the means of attachment 4 and through plate 7, i. e. it is rotatable therein and axially displaceable as long as the holder is not firmly mounted on its support. If, however, the holder is pressed against a stick or pole 3, for example, the teeth of the plate 5 engage in the teeth of the plate 7 and the screw 1 and the camera carried by it are then held firmly in position.

According to Figs. 6 and 7 a polygonal plate 8 is fixedly mounted on the strap 4, or on the means of attachment used instead thereof, and the base-plate 9 of the screw 1 is provided with a recess adapted to receive the plate 8. Consequently, in this form also it is not possible to turn the screw 1 when the holder is firmly held against a support.

Referring now to Figs. 8 to 14 showing special means of attachment for the camera-holder proper, in the construction according to Figs. 8 and 9 the screw 1 is free to rotate in a wire bow or yoke 10 which runs out at its ends into eyelets 11, 12. The eyelets 11 carry a ring 13 to which a chain 14 is connected, and the eyelets 12 carry a lever 15 with which a second lever 16 is pivotally connected at 17. In the illustrative embodiment this lever 16 is provided with a pin 18 located away from its fulcrum 17. If the camera-holder is to be attached, for example, to the trunk 19 of a tree, the bow or yoke 10 is placed against one side of the tree, the chain is led around the other side and hooked over the pin 18 of the lever 16 which then occupies approximately the position shown in dotted lines in Fig. 9, so that the holder already has a certain hold on the tree but is nevertheless attached only loosely. Consequently, the camera firmly screwed on the screw 1 can be adjusted because the base-plate 5 of the screw 1 at present admits of its rotation. As soon as the camera has been adjusted the lever 16 is rocked into the position shown in full lines in Fig. 9 beyond its dead point, and thereby draws the bow or yoke 10 firmly against the tree. As the plate 5 is now firmly pressed against the tree it no longer admits of the screw 1 and the camera thereon being turned, and exposures can be made for any desired length of time without shaking being feared. The rotation of the lever 16 is preferably limited by a stop 20 provided on the lever 15. For the purpose of detaching the camera-holder the lever 16 is rocked back in the direction of the arrow shown in Fig. 9.

A clamp comprising two pivoted limbs may be used for mounting the camera-holder.

The clamp shown in Figs. 10 and 11 is preferably made of flexible wire and possesses two limbs 22 and 23 revolubly connected together by a pivot 21. The former limb 22 carries the screw 1 which is mounted free to rotate in it, is screwed into the female thread of the photographic camera, and is provided on the inside of the clamp with the base-plate 5. The bottom limb 23 consists of two ends of wires which run out at their free ends into eyelets 24, 25, and in these eyelets a bow-shaped lever 26, likewise preferably of wire, is mounted which has at its bottom end a cross-bar 27. One end of an S-hook 28, whose other end engages the limb 23 of the clamp, clasps over this cross-bar. The clamp is so designed that in the illustrated position of the lever 26 the ends of the limbs 22 and 23 of the clamp are drawn close together, so that it is firmly secured to the stick or pole 3. If the clamp is to be detached, the lever 26 must be rocked back in the direction of the arrow shown in Fig. 11. This tightening device is thus formed like the well-known bent-wire stoppers for bottles.

The clamp illustrated in Figs. 12 to 14 likewise comprises two limbs of flexible wire rotatable about a common pivot 21. The limb 22 carries the screw 1 which is for carrying the camera, is free to rotate in a plate 30 connecting the two ends of the limbs 22 and is mounted with a certain amount of play in its longitudinal direction; the screw is prevented from falling out on the one hand by its collar 6 and on the other hand by its base-plate 5. At the free end of the limb 22 is pivoted a screw spindle 31 carrying a nut 32 by means of which the limbs 22 and 23 can be tightened for the purpose of fixing the clamp to a stick 3 for example. As Fig. 13 shows, the limb 23 is constituted by two ends of wires which are preferably bent somewhat in the middle in order to make it suitable for clasping a rod or handle 3′ (Fig. 14). The two parts of the limb 23 can be held together by a wire loop 33 and by a sheet-metal clamp 34. If it is wished to attach a camera by means of such a clamp to a stick, as shown in Figs. 12 and 13, after the camera has been firmly screwed on the screw 1, the clamp is opened by screwing the nut 32 far enough back so that the clamp can be pushed onto the rod; if this is not possible, the nut is entirely removed in order to place the clamp around the rod from the outside; then the nut is screwed on so far that the clamp is slightly tightened, but the plate 5 is still free to rotate on the stick 3 in order that the camera can be adjusted. Only when this has been done is the clamp completely tightened. The plate 5 then presses firmly against the stick 3 and prevents the screw 1 and the camera on it leaving the desired position. As a further security a pin 35 is provided on the plate 30, and the base-plate 5 of the pin 1 has at its edge holes 36 so that the pin 35 enters into one of the holes 36 when the clamp is completely tightened and prevents the plate 5 and the screw 1 rotating with the camera. Obviously, the pin 35 may be provided on the plate 5 and the holes 36 in the plate 30. Further, the pin 35 may be in the form of any other locking device, as is obvious. If the clamp is to be mounted, as shown in Fig. 14, on the handle 3' of an umbrella or walking-stick the two parts of the limb 23 are spread apart after the clamps 33, 34 have been undone, the handle 3' is placed between them, and then the parts of the limb are pressed together until the clamps 33, 34 can be placed around them. If the limbs 22, 23 are then screwed closely enough together the camera will be securely mounted. In order to enable the clamp to be employed for other purposes, the pivot 21 connecting the limbs of the clamp is likewise provided with a screw-thread; this pivot is at right angles to the screw 1 and carries a plate or lock nut 38 which, after the screw 37 has been screwed into the female thread of the camera, is screwed firmly against the latter in order to lock the screw. Further, a third screw 39 is mounted on the same pivot by means of an eye 40 and can be placed into various positions in the central plane of the clamp. If the desired position has been found, the longitudinal parts of the limbs can be pressed against the eye 40 by means of a nut 41 screwed on the pivot 21, so that further rotation of the screw 39 and the camera thereon is prevented. If the span of the clamp is not sufficient for the object to which it is wished to attach the camera, a chain 42 can be used which, on the one hand, is attached to the pivot 21 and, on the other hand, can be hooked into a hook 43 carried by the nut 32.

The base-plate 5 of the screw 1 can be enlarged so that it can itself constitute the limb of a clamp as is shown in the Figs. 15 to 19. The clamp shown in Figs. 15 to 18 comprises a rigid limb 45 carrying the screw 1 and a flexible limb 46. Both the limbs are permanently connected at one end by a pivot 47, while they can be drawn together at the other end by means of a screw 48, pivotally connected to the limb 45, and a winged nut 49. The pivot 47 is here likewise provided with a screw-thread 50 for receiving the camera, while the limb 45 runs out into a screw 51. The screws 1, 50 and 51 are in three planes at right angles to one another, and, consequently, as in the form represented in Figs. 12 to 14, the clamp admits of the camera being placed in very various positions.

The elasticity of the clamps can be obtained in various ways. In the illustrative embodiment according to Figs. 15 to 18, the bottom limb 46 consists of two rigid end parts and flexible wires 46' connecting the same, while in the embodiment according to Fig. 19 the limb 46 is rigid and carries on its inner side a leaf spring 52 preferably bent downward at its ends.

In order to secure a good hold for the clamp, on the handle 53 of a stick, for example, it is preferable to wind the bag 54 for packing the clamp around the stick, and only then to erect the clamp. The flexible wires 46' are then pressed into the bag 54 and afford a good hold to the clamp. When not in use this clamp is folded as shown in Fig. 18.

As many small photographic apparatus possess no female screw for the screw of a stand, as is well-known, it is preferable to supply the clamp shown in Fig. 20 with the above-described camera-holders. This clamp comprises a box-like or bow-like bottom part 55 which is provided on the one side with an internally screw-threaded tube 56 intended for receiving the screw of the camera-holder proper, and on the other side with a spindle 57 having a right-handed and left-handed screw-thread. This spindle carries jaws 58, 59 which when the spindle 57 is rotated in one direction by means of a winged nut 60 move toward one another and hold the camera 61.

In spite of a large number of various illustrative embodiments having been represented it is, of course, possible to embody the invention in other ways, and therefore the invention is not to be understood as limited to the illustrated examples.

All the described camera-holders can be folded up into such a small space that they can be conveniently carried in the waistcoat pocket. For keeping them, a narrow bag is preferably used which is about twice as long as the clamp, so that after inserting the clamp the part of the bag projecting over it can be simply turned over and special closure members, such as dress fasteners, straps and the like are not required for these bags.

I claim:—

1. A camera-holder comprising in combination a camera-supporting screw, a bow connected therewith, and means for clamping the bow against an object to be used as a camera-stand, said clamping means embodying another camera-supporting screw standing at right angles to the aforesaid screw.

2. A camera-holder comprising in combination a camera-supporting screw, a bow connected therewith, and means for clamping the bow against an object to be used as a camera-stand, said clamping means embodying two additional camera-supporting screws standing at right angles to the aforesaid screw and also to each other.

3. A camera-holder, comprising in combination, a camera-supporting screw having a base-plate having holes at its edge, a bow and attachment means for firmly holding the base-plate against a support, and a pin carried by said bow for entering a hole in the base-plate.

4. A camera-holder, comprising in combination, a camera-supporting screw having a base-plate rigidly connected therewith, and a bow placed about the screw, a flexible limb pivotally attached to one end of the bow, and fastening means for the limb pivotally attached to the other end of the bow.

5. A camera-holder, comprising in combination, a camera-supporting screw having a base-plate rigidly connected therewith, a bow placed about the screw, a flexible limb pivotally attached to one end of the bow, and fastening means for the limb pivotally and adjustably attached to the other end of the bow.

6. A camera-holder, comprising in combination, a camera-supporting screw, a bow carrying the same, a limb pivotally connected to the bow, said limb being built up of a plurality of flexible wires.

7. A camera-holder, comprising in combination, a camera-supporting screw, and a bow carrying the same, a limb pivotally connected to the bow, said limb being able to be spread apart.

In testimony whereof, I affix my signature in the presence of two witnesses.

ROBERT NAGLO.

Witnesses:
 HENRY HASPER,
 WOLDEMAR HAUPT.